March 4, 1930.  F. L. M. KENNEY  1,749,730
FILTER DEVICE
Filed June 22, 1928  2 Sheets-Sheet 1
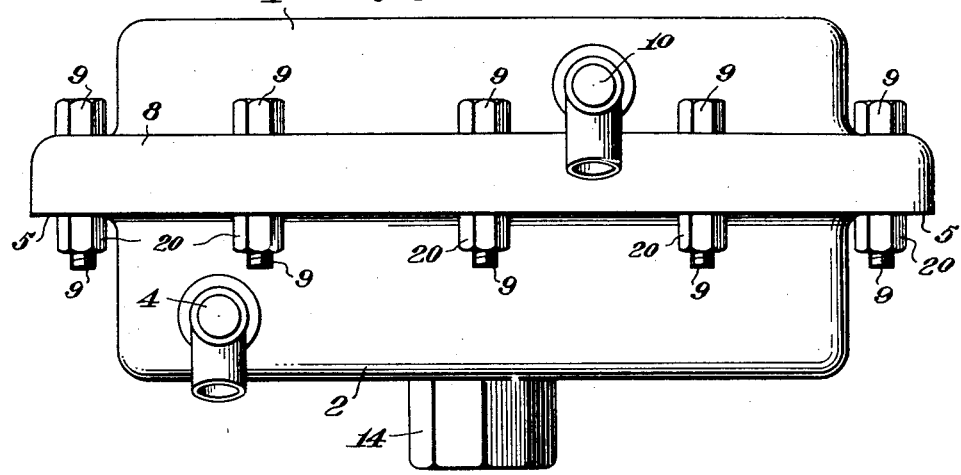
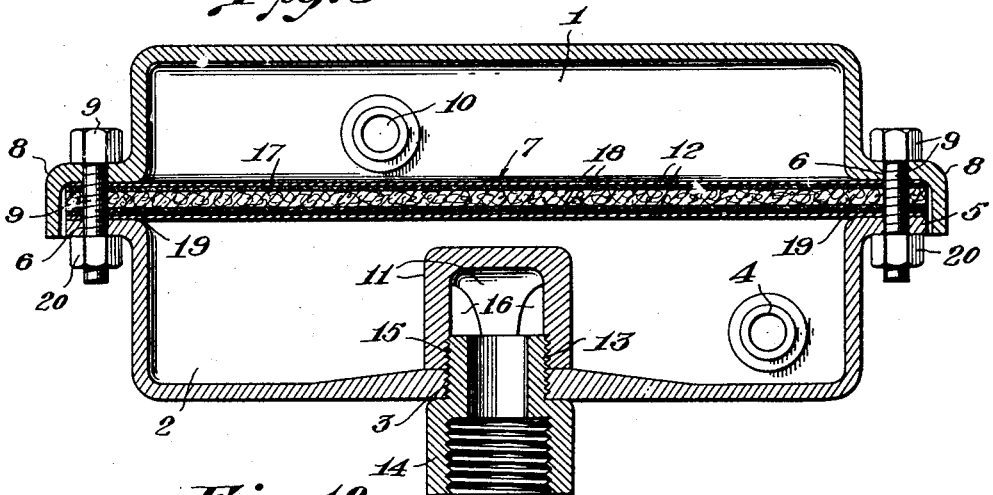
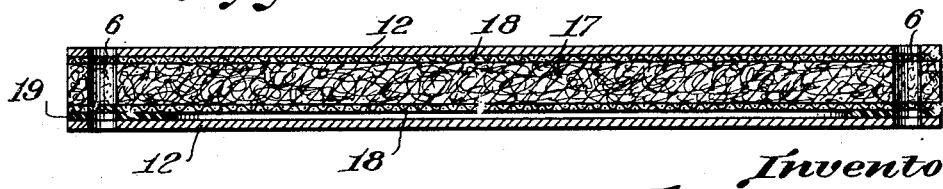
Inventor:
Francis L. M. Kenney March 4, 1930.  F. L. M. KENNEY  1,749,730
FILTER DEVICE
Filed June 22, 1928  2 Sheets-Sheet 2
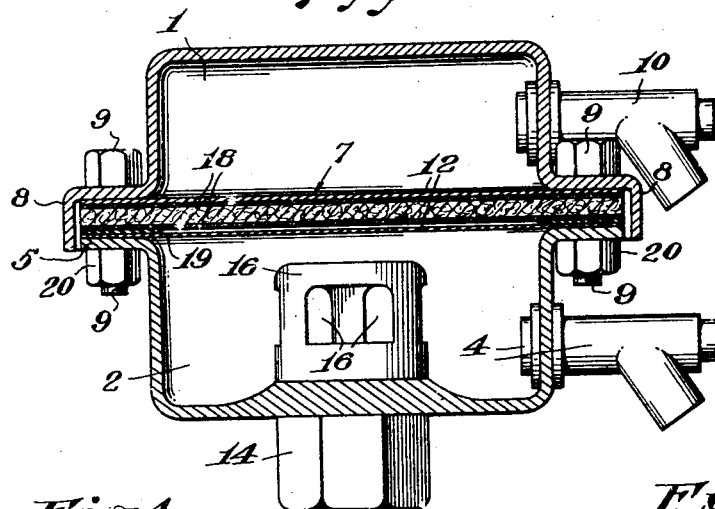
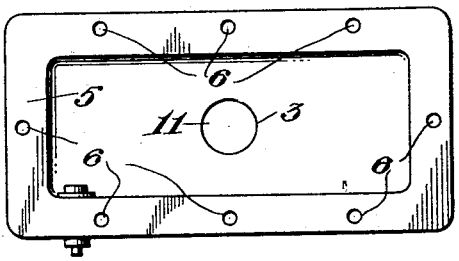
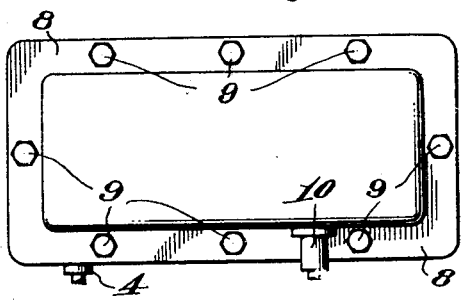
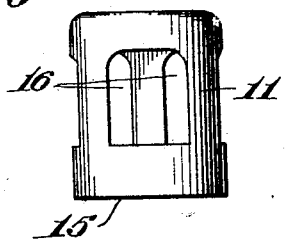
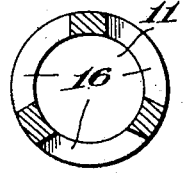
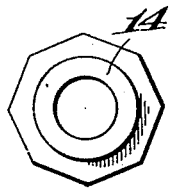
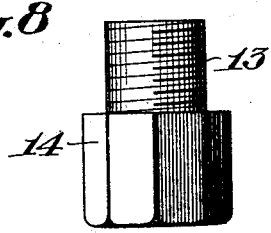
Inventor.
Francis L. M. Kenney.

Patented Mar. 4, 1930

1,749,730

UNITED STATES PATENT OFFICE

FRANCIS L. M. KENNEY, OF LOS ANGELES, CALIFORNIA

FILTER DEVICE

Application filed June 22, 1928. Serial No. 287,433.

The object of my invention is to provide a sanitary, efficient and economical device for purifying water and other liquids, simple in construction and operation and attachable to a supply line or faucet and having easy accessibility of all parts and elements for cleaning and adjusting purposes, renewal of filter elements, etc.

I am aware that there are other devices for filtering water and other liquids under pressure and by gravity seepage.

My invention differs from the past art, being simple and efficient in construction, operation and manipulation, having a new and improved filter box or container divided into two major parts, an upper part and a lower part with means for detachably securing the filter element in place to and between said upper and lower parts at their line of joinder.

The lower part of the container has a threaded opening therein for ingress of liquid and another opening with faucet means for egress of liquid, the upper part of the container having an opening with adjustable faucet means for egress of filtered liquids.

The lower part of the container has a force breaker-liquid spreader device with means for detachably associating same with container ingress opening and with a supply line or faucet.

The breaker-spreader performs a two-fold function, breaking force of liquids entering container and also spreading pressure uniformly over surface of filter element, increasing efficiency of the device and eliminating troubles caused by liquid pressure tearing, mussing, breaking and damaging the filter materials. With this device filter materials of fibrous composition may be employed to advantage.

The one-piece combination threaded nipple means for connecting a supply line or faucet with ingress opening of container and with the breaker-spreader means, simplifies and improves the assembly and construction of the various parts.

The improved filter box or container having ingress means for unfiltered liquid through its bottom part beneath the filter element, the liquid being forced upward by pressure through the filter element and into upper part or chamber of container is dispensed therefrom by adjustable faucet means, and the faucet means in lower part of container for dispensing unfiltered liquids improve the construction, operation and efficiency of the device as a whole.

A filter element composed preferably of asbestos, diatomaceous earth or un-glazed porcelain is used.

The details and structural arrangement are shown in the drawings, wherein:

Fig. I, a front elevation view of assembled filter.

Fig. II, a sectional view of filter, showing the interior arrangement of front of filter when assembled.

Fig. III, a sectional view of Fig. I, at line A—A, showing interior and exterior arrangement of filter parts when assembled.

Fig. IV, is a plan view of the lower part, with the filter element removed.

Fig. V, a plan view of filter when assembled.

Fig. VI, an elevation view of the force breaker-liquid spreader device.

Fig. VII, a sectional view of Fig. VI, at line B—B.

Fig. VIII, is an elevation view of the male-female nipple device.

Fig. IX, is a plan view of Fig. VIII.

Fig. X, is a sectional view of filter element showing straining fabric employed with fibrous material.

Note: The drawings are not made to scale owing to lack of space.

Like parts are identified by same reference characters, throughout the several views.

Referring to the drawings my invention comprises:

The apparatus consists of a filter box or container divided into two major parts, an upper part 1 and a lower part 2, the line of division being the line of joinder of said upper and lower parts when assembled. The lower part has a threaded opening 3 with associated means for ingress of un-filtered liquid and another opening 4 with faucet means for egress of liquid, the lower part of the container having otherwise closed sides and bottom and carrying a flange 5 on its upper marginal rim and the upper part of container having an adjustable faucet means 10 for dispensing filtered liquid and carries a skirted flange 8 at its lower marginal rim. The marginal rims carry bolt holes 6 therein for associating with similar holes 6 in the filter element 7 interposed between said upper and lower parts of container. The unfiltered liquid enters the lower part of filter container through a nipple device 14 in threaded opening 3 of the container bottom and through the breaker-spreader device 11 is thence forced by pressure upward and through the filter element 7 into the upper part of container 1, the liquid thus filtered being dispensed therefrom by adjustable faucet means 10.

A grated metal means 12 forms a detachable support for the filter element between the upper 1 and the lower 2 parts of container.

A threaded means in nature of a male-female nipple device 14, is detachably associating with the opening 3 in lower part of the container with a supply line or faucet, the thread 13 on male end of nipple 14 projecting through the opening 3 in the container bottom and engaging the threaded opening 15 of the breaker-spreader device 11.

The force breaker-liquid spreader means 11 in nature of a threaded pipe-cap 15 has a closed end and openings 16 in and through its walls and surface, to break force of liquid entering container and spread same over filter element.

A filter element 7 composed of porous or fibrous material is supported between said container flanges with perforated metal or metallic straining fabric 18 and suitable gaskets intervening.

Means are provided for detachably securing the filter element to and between the marginal rims of container upper 8 and lower 5 parts, at their line of joinder when assembled, by bolt 9 and fastener 20 means, said bolts to project through holes 6 in the marginal rims of the filter element and of the container upper and lower parts.

Having thus described my invention, what I claim as new and desire to secure by Letters Patent is as follows:

1. In a filter, a filter container divided into two major parts an upper part and a lower part, the upper part carrying a skirted flange on its lower marginal rim and the lower part carrying a flange on its upper marginal rim with suitable means for detachably associating said upper and lower parts together, an opening in lower part of container for ingress of liquid and another opening therein with faucet means for egress of non-filtered liquid and an opening in top part of container with adjustable faucet means therein for egress of filtered liquid, a filter element composed of porous material supported by grated metal means with gaskets intervening between filter element and container flanges and means for detachably securing filter element in place to and between upper and lower parts of container, detachable means for breaking force of liquid entering container and for spreading same over filter element and threaded means for associating filter with a supply line.

2. In a filter a container divided into two major parts an upper part and a lower part, said upper part carrying a skirted flange on its lower marginal rim and said lower part carrying a flange on its upper marginal rim, suitable means for detachably associating said upper and lower parts together, said lower part of container having a threaded opening for ingress of liquid and another opening with faucet therein for egress of liquid and the upper part of container having an opening with adjustable faucet means therein for egress of filtered liquid, a filter element incorporating fibrous material supported by grated metal means and strainer fabric and means for detachably securing the filter element in place to and between upper and lower parts of container with gaskets intervening, detachable means for breaking force of liquid entering container and spreading same over filter element and threaded means for associating filter with a supply line.

3. In a filter a container in two major parts an upper part and a lower part, said upper part carrying a skirted flange on its lower marginal rim and said lower part carrying a flange on its upper marginal rim, the lower part of container having a threaded opening for ingress of liquid and the upper part of container having an opening with adjustable faucet means for egress of filtered liquid, a filter element composed of porous material supported by grated metal means detachably secured in place to and between upper and lower parts of container with suitable gaskets intervening, detachable means for breaking force of liquid entering container and spreading same over filter element and means in nature of a combination male-female nipple for detachably associating ingress opening of container bottom with and to a liquid supply line or faucet and with said force breaker-spreader means.

4. In a filter, a container in two major parts an upper part and a lower part, said upper part carrying a skirted flange on its lower marginal rim and said lower part carrying a flange on its upper marginal rim, the lower part having a threaded opening for ingress of liquid and another opening with faucet means for egress of liquid and said upper part having an opening with adjustable faucet means for egress of filtered liquid, a filter element composed of porous material supported in place by perforated metal means with gaskets and metal strainer fabric intervening and means for detachably securing filter element in place to and between upper and lower parts of container, threaded means in nature of a combination male-female nipple device for detachably associating ingress opening of container with a liquid supply line.

5. In a filter a container in two major parts an upper part and a lower part, said upper part carrying a skirted flange on its lower marginal rim and the lower part carrying a flange on its upper marginal rim and means for detachably associating said upper and lower parts together, said lower part having a threaded opening for ingress of liquid and an opening with faucet means for egress of liquid and said upper part of container having an opening with adjustable faucet means for egress of filtered liquid, a filter element composed of porous material supported by perforated metal means and means for securing the filter element in place to and between the upper and lower parts of container with suitable gaskets intervening, detachable means for breaking force of liquid entering container and threaded means in nature of a combination male-female nipple device for detachably associating ingress opening of container bottom with and to a liquid supply line.

6. In a filter the combination of a container in two major parts an upper part and a lower part, said upper part carrying a skirted flange on its lower marginal rim and said lower part carrying a flange on its upper marginal rim, said container lower part having a threaded opening for ingress of liquid and also an opening with faucet means for egress of liquid and the upper part of container having an opening with adjustable faucet means therein for egress of filtered liquid, a filter element incorporating porous material supported by grated metal means and means for detachably securing filter element in place between top and bottom parts of container with suitable gaskets intervening, detachable means for breaking force of and for spreading liquid entering the container and threaded means for detachably associating ingress opening of container with a supply line and with the force breaker-spreader means.

7. In a filter the combination of a container in two major parts an upper part and a lower part, said upper part carrying a skirted flange on its lower marginal rim and said lower part carrying a flange on its upper marginal rim and means for associating said upper and lower parts together, said lower part of container having a threaded opening for ingress of liquid and the upper part of container having an opening with faucet means for egress of filtered liquid, a filter element incorporating porous materials supported by metal means, means for securing filter element in place to and between top and bottom parts of container with gaskets intervening, means for breaking force of and for spreading liquid entering container and a combination male-female nipple device for detachably associating the ingress opening of the container with a liquid supply line and with said force breaker-spreader means.

8. In a device of the kind described the combination of a container in two major parts an upper part and a lower part, said upper part carrying a skirted flange on its lower marginal rim and said lower part carrying a flange on its upper marginal rim, said rims to carry bolt-holes for detachably securing therewith by bolt-like means the intervening filter element, a filter element of porous material supported in place by perforated metal means with gaskets intervening between said element and the container casing, the lower part of container having a threaded opening for ingress of liquid and the upper part of container having an opening with adjustable faucet means for egress of filtered liquid, means for breaking force of and for spreading liquid entering container and threaded means in nature of a combination male-female nipple device for detachably associating ingress opening of container bottom with and to a liquid supply line and with said force breaker-spreader means.

9. In a filter a container in two major parts an upper part and a lower part, said upper part carrying a skirted flange on its lower marginal rim and said lower part carrying a flange on its upper marginal rim, said rims to carry bolt-holes to detachably associate therewith by bolt-like means the intervening filter element, a filter element composed of porous material supported in position by perforated metal means and means for detachably securing the filter element in place to and between said upper and lower parts of container with suitable gaskets intervening, the lower part of container having a threaded opening for ingress of liquid and an opening with faucet means for egress of liquid and the upper part of container having an opening with faucet means for egress of filtered liquid, detachable means for breaking force of liquid entering container and spreading same over filter element, threaded means in nature of a combination nipple for detachably associating ingress opening of container lower part with and to a supply line or faucet and with said force breaker-spreader means.

10. In a device of the kind described, a container in two major parts an upper part and a lower part, said upper part carrying a skirted flange on its lower marginal rim and said lower part carrying a flange on its upper marginal rim, said upper part having an opening with faucet means therein for egress of filtered liquid and the lower part having an opening for ingress of liquid and another opening for egress of liquid, threaded means in nature of a combination male-female nipple device for detachably associating the threaded ingress opening of container with and to a liquid supply line or faucet and with a force breaker-spreader means positioned within the container, said force breaker-spreader means in nature of a pipe-cap having a closed end and openings through the wall thereof to break force of and spread liquid over filter element and a threaded means for detachably connecting said breaker-spreader device in position, a filter element and suitable means to support same in position and bolt-like means for detachably securing said filter element and supports to and between the marginal rims of container upper and lower parts.

11. In a device of the kind described, a container in two major parts an upper part and a lower part, said upper part carrying a skirted flange on its lower marginal rim and said lower part carrying a flange on its upper marginal rim, said upper part having an opening with adjustable faucet means for egress of filtered liquid and said lower part having an opening for ingress of liquid and another opening with faucet means for egress of liquid, threaded means in nature of a combination nipple device for detachably associating the ingress opening of container bottom with and to a liquid supply line and with a force breaker-liquid spreader device, said force breaker-liquid spreader in nature of a pipe-cap having a closed end and openings through the wall thereof to break force of and to spread liquid entering the container and suitable means for detachably connecting said breaker-spreader means in position, a filter element incorporating porous material supported between metal fabric and bolt-like means for detachably securing said filter element with suitable intervening gaskets to and between the marginal rims of container upper and lower parts.

12. In a device of the kind described, the combination of a filter box or container divided into two major parts an upper part and a lower part, the upper part carrying a skirted flange on its lower marginal rim and an opening with adjustable faucet means therein for egress of filtered liquid and the lower part of container having an opening for ingress of liquid and carrying a flange on its upper marginal rim, a filter element composed of porous material supported in place by a grated metal means with suitable gaskets intervening, and means for detachably securing said filter element and supports to and between said marginal rims of the container, threaded means in nature of a combination male-female nipple device for detachably associating the ingress opening of container bottom with and to a liquid supply line and with a force breaker-liquid spreader positioned within said container.

13. In a filter the combination of a filter box or container divided into two major parts an upper part and a lower part, said upper part having a skirted flange on its lower marginal rim and an opening with faucet means for egress of filtered liquid and the lower part of container having an opening for ingress of liquid and another opening with faucet means therein for egress of liquid, a combination threaded nipple means for detachably associating the threaded ingress opening of container bottom with and to a liquid supply line and with a liquid spreader-force breaker means positioned within the container, a filter element composed of fibrous material interposed between metal strainer fabric and supported in place by perforated metal means, bolt-like means for detachably securing filter element and supports between marginal rims of container upper and lower parts with suitable gaskets intervening.

14. In a filter a filter container divided into two major parts an upper part and a lower part, said upper part carrying a skirted flange on its lower marginal rim and said lower part carrying a flange on its upper marginal rim, the lower part of container having an opening for ingress of liquid and another opening therein with faucet means for egress of liquid, the upper part of container having an opening with adjustable faucet means for egress of filtered liquid, a filter element composed of porous material supported in position by grated metal means with bolt-like means for detachably securing the filter element in place to and between the top and bottom parts of container with gaskets intervening, a suitable force breaker-liquid spreader means positioned within the filter container to break force of and spread liquid entering the container, and a threaded nipple means for associating said ingress opening of filter container with said breaker-spreader means and with a supply line.

15. In a device of the kind described a container in two major parts an upper part and a lower part, said upper part carrying a skirted flange on its lower marginal rim and said lower part carrying a flange on its upper marginal rim, the upper part having an opening with faucet means therein for egress of filtered liquid and the bottom part having an opening for ingress of liquid and another opening with faucet means for egress of unfiltered liquid, a threaded male-female combination nipple device for detachably associating the ingress opening of container bottom with a liquid supply line and with the force breaker-liquid spreader positioned within said container, said force breaker-liquid spreader in nature of a threaded pipe-cap having a closed end and openings through the shell thereof to break force of liquid and spread same over filter element, a filter element and suitable means to support same in place and bolt-like means for detachably securing filter element and supports in position between the marginal rims of container top and bottom parts, said bolt-like means to be detachably secured by suitable fasteners.

16. In a filter the combination of a filter box or container divided into two major parts an upper part and a lower part, the upper an upper part and a lower part, the upper part carrying a skirted flange on its lower marginal rim and said lower part carrying a flange on its upper marginal rim, the upper part having an adjustable faucet means for egress of filtered liquid and the lower part of container having a threaded opening for ingress of liquid and another opening with faucet means therein for egress of liquid, said faucet means is adjustable for directing flow of liquid in any desired direction, threaded means in nature of a combination nipple for detachably associating ingress opening of container bottom with and to a liquid supply line and with a force breaker-liquid spreader means positioned within said container, a filter element composed of porous material interposed between metal strainer fabric, and grated metal means for supporting filter element in place between said container flanges with gaskets intervening, bolt-like means for detachably securing said filter element, supports and gaskets to and between said marginal rims of container upper and lower parts with suitable fasteners for said bolt-like means.

FRANCIS L. M. KENNEY.